United States Patent [19]

Johnson et al.

[11] Patent Number: 4,580,846
[45] Date of Patent: Apr. 8, 1986

[54] WHEEL-CASED BEARING

[75] Inventors: Thomas J. Johnson; Harold W. Muensterman, both of Evansville, Ind.

[73] Assignee: Hoosier Stamping & Mfg. Corp., Evansville, Ind.

[21] Appl. No.: 286,702

[22] Filed: Jul. 24, 1981

[51] Int. Cl.⁴ ................................................. B60B 1/06
[52] U.S. Cl. ............................. 301/63 DD; 29/159.01; 384/523
[58] Field of Search .......................... 29/159.01, 159.3; 308/189 R, 191, 216; 301/63 R, 63 DD, 63 DT, 63 DS, 109, 110; 384/188, 523

[56] References Cited

U.S. PATENT DOCUMENTS

| | | | |
|---|---|---|---|
| 321,053 | 6/1885 | Rice | 308/189 R |
| 1,408,825 | 3/1922 | Palmer | 301/63 DD |
| 1,627,558 | 5/1927 | Grunwald | 301/63 DT |
| 1,932,289 | 10/1933 | Jarvis et al. | 301/63 DD |
| 1,973,747 | 9/1934 | Bukolt | 301/63 DD |
| 2,427,430 | 9/1947 | Waldeck et al. | 301/63 DD |
| 2,848,278 | 8/1958 | Todd | 301/63 DS |
| 3,020,091 | 2/1962 | Solomon | 301/63 DD |
| 3,336,057 | 8/1967 | Bloomquist | 308/216 |
| 3,565,490 | 2/1971 | Statz | 301/63 DD |

Primary Examiner—H. Grant Skaggs
Attorney, Agent, or Firm—Woodard, Weikart, Emhardt & Naughton

[57] ABSTRACT

A rubber tired wheel assembly is provided with two wheel rim blanks welded together after the installation of ball bearing assemblies in each of the rim blanks. The bearing assemblies are retained by casing caps confining the bearing outer races in wells in the rim blanks, the casing caps being projection welded to the rim blanks to locate and secure the bearing assemblies concentric with tire receiving surfaces of the rim blanks.

9 Claims, 3 Drawing Figures

WHEEL-CASED BEARING

BACKGROUND OF THE INVENTION

1. Field of the Invention

This invention relates generally to wheels, and more particularly to ball bearing wheels for small, lightweight devices such as lawn mowers, for example.

2. Description of the Prior Art

Typical prior art construction has employed a couple of wheel rim blanks welded together with one or more bearing assemblies pressed into the assembled rim blanks. This has required use of bearing assemblies which have the strength to withstand the forces involved in installing them in the wheel blanks. It also requires some degree of precision in the rim blanks in order to be sure that the bearing receiving surfaces are concentric with the tire receiving surfaces of the assembled rim blanks so that the bearing assemblies, when installed, will be concentric with the tire.

SUMMARY OF THE INVENTION

Described briefly, according to a typical embodiment of the present invention, a wheel assembly is made by employing a pair of rim blanks. Each blank has a bearing assembly installed in the rim blank by capturing the bearing assembly between the rim blank and an inner casing cap which is projection welded to the rim blank. The rim blanks are then welded together and a tire is installed to complete the wheel assembly.

It is an object of the present invention to provide a ball bearing wheel assembly of lighter weight and lower cost than obtainable with conventional construction.

DESCRIPTION OF THE PREFERRED EMBODIMENT

Figure 1:
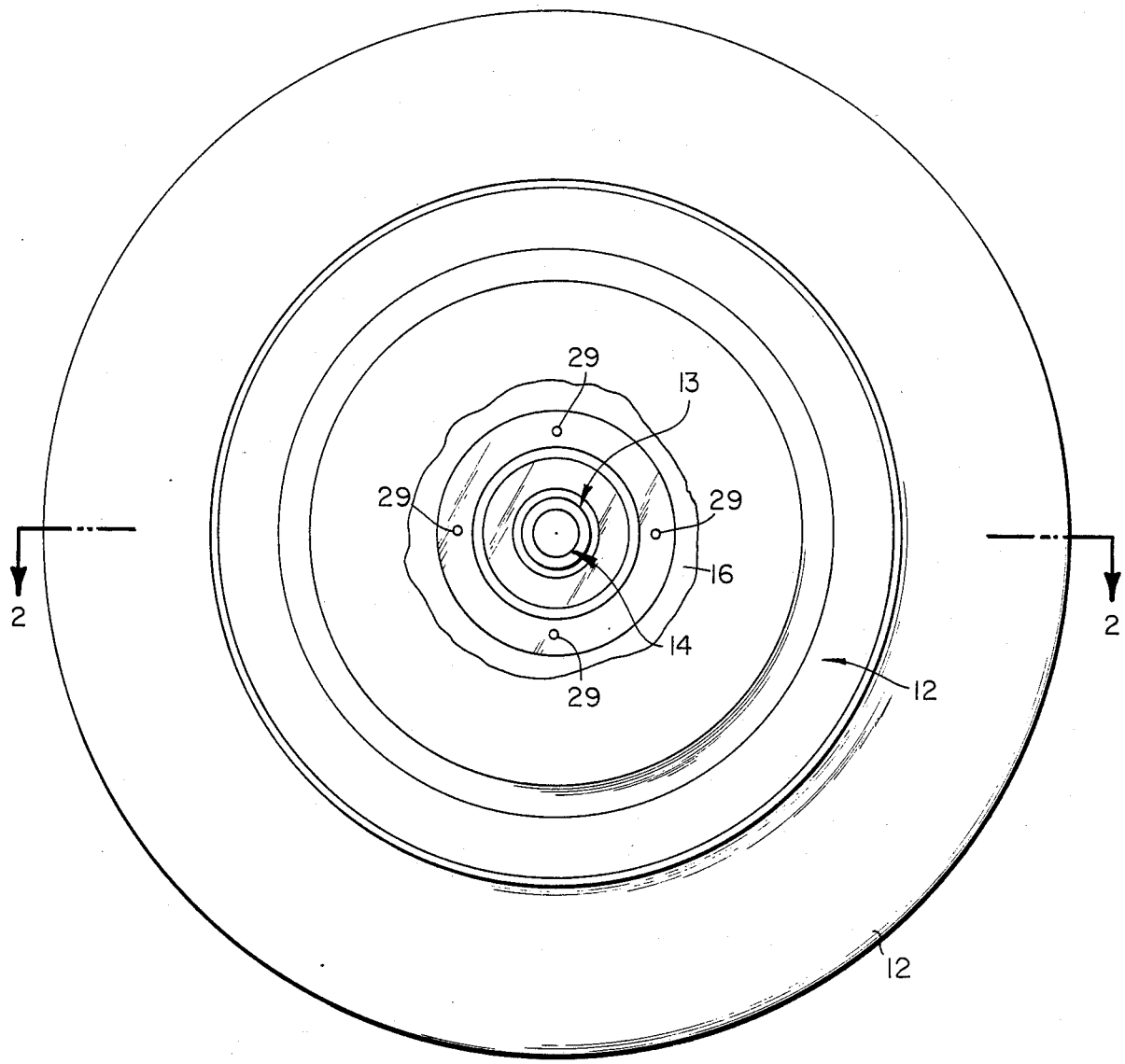
FIG. 1 is a front view of a wheel assembly employing wheel-cased bearing assemblies according to a typical embodiment of the present invention, with the center portion being broken out to show the inner casing cap installation.

Referring now to the drawings in detail, the wheel assembly of FIG. 1 includes the rubber tire 11 mounted on the rim assembly 12 having a bearing assembly in it at 13 with an axle-receiver inner race tube 14. The central portion of one of the rim blanks of the rim assembly is broken away at 16 in FIG. 1 to expose the bearing assembly 13, axle-receiving inner race tube 14, and inner casing cap 17, which parts are identified also in FIG. 2 by the same reference numerals.

The rim assembly 12 comprises a rim blank 12A and rim blank 12B. These blanks are identical or similar and are spot welded together at a suitable number of circularly spaced points on their web portions 18A and 18B, respectively. Accordingly, the concavo-convex outer perimetrical surfaces thereof cooperate to form a tire receiving groove or channel 19.

According to a typical embodiment of the present invention, the rim blank is dished and includes a well 21, and the bearing sub-assembly 13 is received in the well 21 in the rim blank 12B. This bearing sub-assembly includes an axle receiving inner tube 14 having a circumferential bearing receiver groove 22 therein receiving the ball bearings 23. The outer race 24 is typically a discontinuous ring of roll-formed wire having an end gap of approximately 0.030 inch which, upon assembly, may be reduced to approximately 0.005 inch. Accordingly, this outer race wire confines the bearing balls in the inner race groove 22 even with the 0.030 inch end gap in the wire. When it is installed in the well 21, the conical or chamfer lead-in guide and locating wall 26 in the well receives and pilots the outer race ring 24. The inner casing cap 17 provided according to the present invention, has a like well 27 with conical lead-in surface 28 thereon. It also has four dimples 29 formed therein to facilitate projection welding to the rim blank 12B. Accordingly, the two pieces, namely the inner casing cap 17 and rim blank 12B, are welded together by projection welding at the dimples, with the casing cap carefully located so that its cone surface 28 and the cone surface 26 of the rim blank are concentric with each other and with the tire bead margin 31 of the rim blank. In this way, as the casing cap is installed on the rim blank, the conical surfaces 26 and 28 close on the roll-formed wire outer race ring 24, closing the end gap to more nearly 0.005, with a result that the bearing assembly is centered on the axis 32 so that the axle receiving inner race tube 14 is concentric with the tire receiving portion 31 of the rim.

The bearing assembly in the rim blank 12A is installed in exactly the same way. Following that, the two assemblies are mounted with their web portions 18A and 18B together, and a dowel rod or axle is received through the respective axle receiving inner race tubes of the two bearing assemblies, whereupon the rims are spot welded together in at least four circularly spaced locations around the webs. They are preferably spot welded in at least seven locations. Then the assemblies are painted. Following that, the tire is installed. Installation of the tire can be done with the assistance of heat and/or simply mechanical installation tools or machines utilizing the resilience of the rubber to accommodate the stretch needed to get the tire over the rim edge of maximum diameter, and return it to snug self-retention on the rim assembly.

As an example of the bearing sub-assemblies which can be used, the sub-assembly PA 641-4 provided by the Freeway Corporation of 9301 Allen Drive, Cleveland, Ohio 44125, is suitable. Another is the No. BF 1127-502A sub-assembly manufactured by Kendale Industries of 7600 Hub Parkway, Valley View, Ohio 44125. That sub-assembly is normally part of their bearing assembly No. XB 1330, but the entire bearing assembly is not needed due to the present invention.

Although such bearing assemblies can be installed without closing the end gap, the feature of the present invention using the combined action of the conical surfaces on the rim blank and casing cap significantly improves run-out of the tire tread 35 in the complete assembly, the run-out being the difference between the maximum and minimum distance of the tire thread from the bearing axis 32 as the wheel turns about the axis 32 of its bearing assembly inner races.

The axle receiving tubes 14 of the bearing assemblies project through the apertures 33A and 33B of the rim blanks 12A and 12B, respectively, and beyond planes normal to axis 32 and tangent the sidewalls 34 and 36 of the tire. Although this is a feature of the illustrated structure, it is not essential to the practice of the invention. It is beneficial because it facilitates stand-off of the tire from the frame of the lawn mower or other device to which the wheel assembly is to be mounted.

Figure 2:
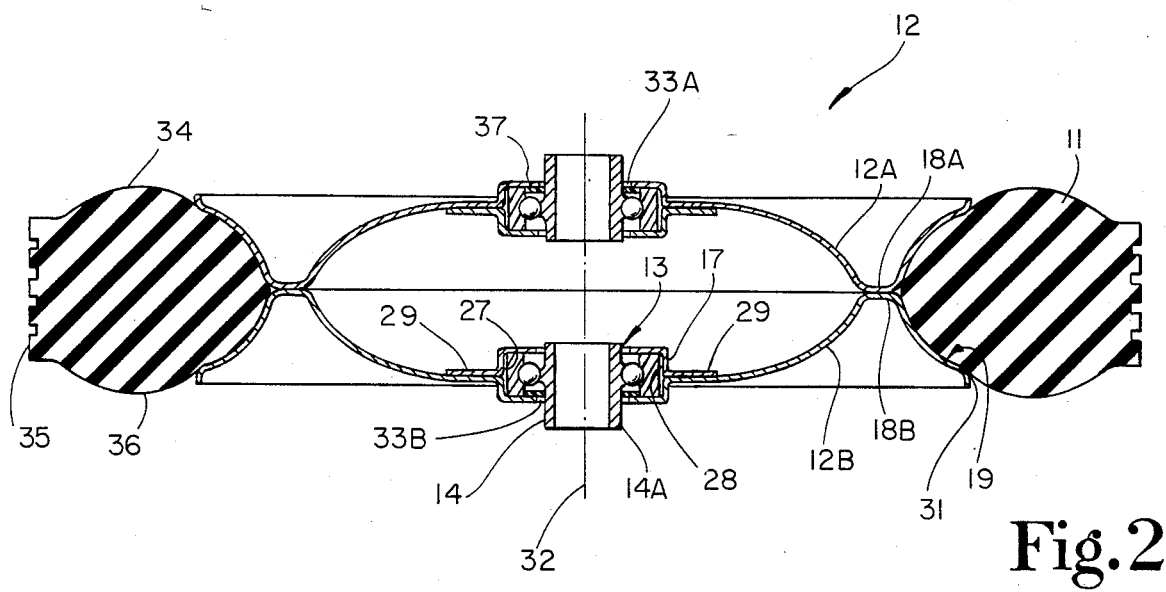
FIG. 2 is a cross section taken at line 2—2 in FIG. 1 and viewed in the direction of the arrows.
Figure 3:
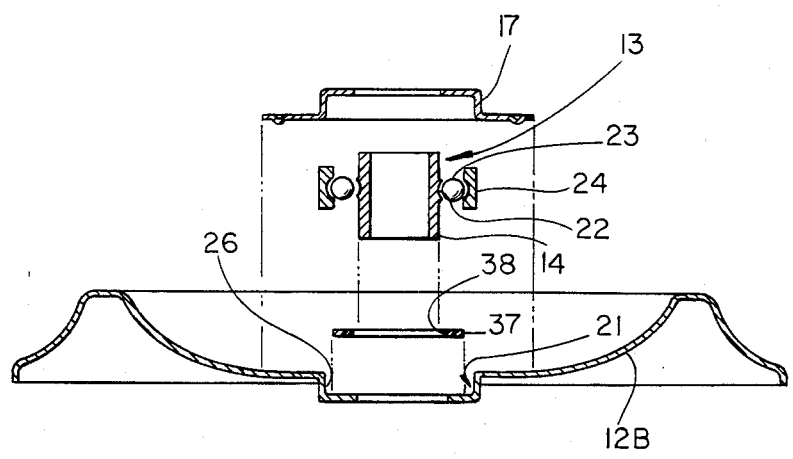
FIG. 3 is an exploded sectional view of half of the rim and bearing sub-assembly of FIG. 2.

As shown in FIG. 3, a dirt shield 37 is provided between the bottom of the well 21 and the bearing balls. This may be made of a heat resistant plastic material such as "Mylar" brand film, 0.008 to 0.010 inches thick, for example. The inner edge 38 of the central aperture of the dirt shield would be of slightly greater diameter than that of surface 14A of the bearing inner race. The outside diameter would be slightly less than the inside diameter of the outer race. Therefore, it fits between the races and covers the gap between the inner race and the rim blank aperture. It thus excludes dirt from the bearings. This dirt shield is provided in each of the rims outboard of the bearings as shown in FIG. 2. The dirt shields can be omitted, if desired. Whereas the enclosed drawings show a typical bearing sub-assembly, there are many similar sub-assemblies, including ones which provide for touching inner races. This is accomplished by having longer inner races on said sub-assemblies. This invention is equally applicable to these.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A wheel cased bearing assembly comprising:
   a first tubular member having bearing ball receiving channel means on an outer perimetrical surface;
   bearing balls received in said channel means in a circular array around said member;
   a first ring concentric with said tubular member and extending around said balls and holding them in said channel means;
   a first wheel rim blank having a central aperture for receiving an axle projecting through it, an inner marginal portion receiving said ring, and an outer marginal portion shaped to receive a tire and having a center;
   a first casing cap having a central aperture and an inner marginal portion cooperating with said inner marginal portion of said rim blank to secure said ring to said rim blank, and thereby secure the assembly of said first ring, bearing balls and first tubular member to said rim blank;
   a second tubular member having bearing ball receiving channel means on an outer perimetrical surface;
   bearing balls received in said channel means of said second member in a circular array;
   a second ring concentric with said second tubular member and confining the balls in said channel means of said second member;
   a second wheel rim blank and cap having cooperating inner marginal portions to secure said second ring to said second rim blank and thereby secure the assembly of said second ring, bearing balls and second tubular member to said second rim blank,
   said first and second wheel rim blanks being affixed together so that said first and second tubular members are axially spaced on colinear axes;
   a tire received on the outer marginal portion of said first wheel rim blank and on a corresponding outer marginal portion of said second wheel rim blank;
   the tread of the tire being centered on said colinear axes,
   said caps being inside a cavity formed by said affixed rim blanks,
   said inner marginal portion of said second wheel rim blank having a central aperture,
   the inner marginal portion of each of said rim blanks being dished to provide a well in each of said blanks, each well having locator means peripherally engaging said ring engaged by said marginal portion and centering said ring with reference to said tire receiving outer marginal portion of said rim blanks,
   said inner marginal portion of said caps being dished to provide wells having locator means peripherally engaging said rings and centering said caps with said rings to cooperate with said rim blanks and case said rings and bearing balls.

2. The assembly of claim 1 and further comprising:
   dirt shield washers between said bearing balls and the inner marginal portions of said rim blanks.

3. The assembly of claim 2 wherein:
   said washers circumferentially engage the outer peripheral surfaces of said tubular members and a face of said inner marginal portions of said rim blanks.

4. The assembly of claim 1 wherein:
   each of said rings is discontinuous, having an end gap; and
   at least one of said locator means at a well casing each of said rings has a lead-in wall portion holding said ring in a resilient stressed condition with less end gap than the ring has when said ring is unassembled.

5. The assembly of claim 4 wherein:
   said lead-in walls are conical.

6. A method of casing a bearing assembly comprising the steps of:
   placing a casing cap against the rim blank of a wheel; and
   welding the cap to the blank while clamping the outer race of the bearing assembly between said cap and blank with clamping force applied radially inward on a portion of said bearing assembly.

7. The method of claim 6 wherein:
   said clamping is caused by said cap and blank engaging said outer race with lead in surfaces of said cap and blank.

8. The method of claim 7 wherein:
   the welding is projection welding.

9. The method of claim 7 wherein:
   said outer race is located concentric with a tire receiving channel in said rim blank by conically centering the outer race in conical centering locator means on said rim blank.

* * * * *